United States Patent
Sekiguchi

(10) Patent No.: US 11,102,366 B2
(45) Date of Patent: Aug. 24, 2021

(54) IMAGE FORMING APPARATUS THAT JUDGES IF AN IMAGE OF A POST-PROCESSING MARK IS PRESENT IN THE SCAN DATA OF A DOCUMENT

(71) Applicant: KYOCERA Document Solutions Inc., Osaka (JP)

(72) Inventor: Yasuhiro Sekiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/909,144

(22) Filed: Jun. 23, 2020

(65) Prior Publication Data

US 2020/0412894 A1 Dec. 31, 2020

(30) Foreign Application Priority Data

Jun. 26, 2019 (JP) .............................. JP2019-118479

(51) Int. Cl.
*H04N 1/04* (2006.01)
*H04N 1/00* (2006.01)

(52) U.S. Cl.
CPC ..... *H04N 1/00761* (2013.01); *H04N 1/00639* (2013.01); *H04N 1/00737* (2013.01); *H04N 1/00782* (2013.01)

(58) Field of Classification Search
CPC ........... H04N 1/00761; H04N 1/00639; H04N 1/00737; H04N 1/00782
USPC ........................................ 358/1.1–1.18, 474
See application file for complete search history.

(56) References Cited

U.S. PATENT DOCUMENTS

| | | | | |
|---|---|---|---|---|
| 2010/0027076 A1* | 2/2010 | Wilsher | ................... | G06T 5/005 |
| | | | | 358/3.26 |
| 2010/0172663 A1* | 7/2010 | Nakai | ................ | G03G 15/6591 |
| | | | | 399/45 |
| 2016/0044190 A1* | 2/2016 | Miyaji | ................. | H04N 1/3255 |
| | | | | 358/1.15 |
| 2017/0318176 A1* | 11/2017 | Nishikawa | ......... | H04N 1/00466 |

FOREIGN PATENT DOCUMENTS

JP 2007-326690 12/2007

* cited by examiner

*Primary Examiner* — Gabriel I Garcia
(74) *Attorney, Agent, or Firm* — Wenderoth, Lind & Ponack, L.L.P.

(57) ABSTRACT

An image forming apparatus includes a document reading unit reading an image of a document and generating scan data of the document and a printing unit printing on a sheet the scan data generated by the document reading unit, and is configured to be able to feed the sheet subjected to printing by the printing unit to a post-processing device. The image forming apparatus includes a judging unit that judges whether an image of a post-processing mark which is composed of a staple mark or a punching hole is present in the scan data generated by the document reading unit, and a printing control unit that, when the judging unit judges that the image of the post-processing mark is present in the scan data, generates corrected data by deleting the image of the post-processing mark from the scan data and causes the printing unit to print the corrected data.

5 Claims, 7 Drawing Sheets

IMAGE FORMING APPARATUS THAT JUDGES IF AN IMAGE OF A POST-PROCESSING MARK IS PRESENT IN THE SCAN DATA OF A DOCUMENT

CROSS-REFERENCE TO RELATED APPLICATION

This application is based upon and claims the benefit of priority from Japanese Patent Application No. 2019-118479 filed on Jun. 26, 2019, the entire contents of which are incorporated herein by reference.

BACKGROUND

The technology disclosed herein relates to an image forming apparatus.

An image forming apparatus has been known which includes a document reading unit reading an image of a document and generating scan data of the document and a printing unit printing on a sheet the scan data generated by the document reading unit and feeds the printed sheet to a post-processing device.

Examples of a post-processing performed by the post-processing device include stapling for fastening an end portion of a bundle of printed sheets with a staple, and punching for piercing a punching hole in an end portion of a printed sheet.

SUMMARY

An aspect of the present disclosure provides an image forming apparatus including a document reading unit and a printing unit. The document reading unit reads an image of a document and generates scan data of the document. The printing unit prints on a sheet the scan data generated by the document reading unit. The image forming apparatus is configured to be able to feed the sheet subjected to printing by the printing unit to a post-processing device. The image forming apparatus includes a judging unit and a printing control unit. The judging unit judges whether an image of a post-processing mark which is composed of a staple mark or a punching hole is present in the scan data generated by the document reading unit. When the judging unit judges that the image of the post-processing mark is present in the scan data, the printing control unit generates corrected data by deleting the image of the post-processing mark from the scan data and causes the printing unit to execute printing of the corrected data.

DETAILED DESCRIPTION

Hereinafter, an example embodiment of the present disclosure will be described in detail on the basis of the drawings. It should be understood that the technology disclosed herein is not limited to the embodiment described below.

Embodiment

Figure 1:
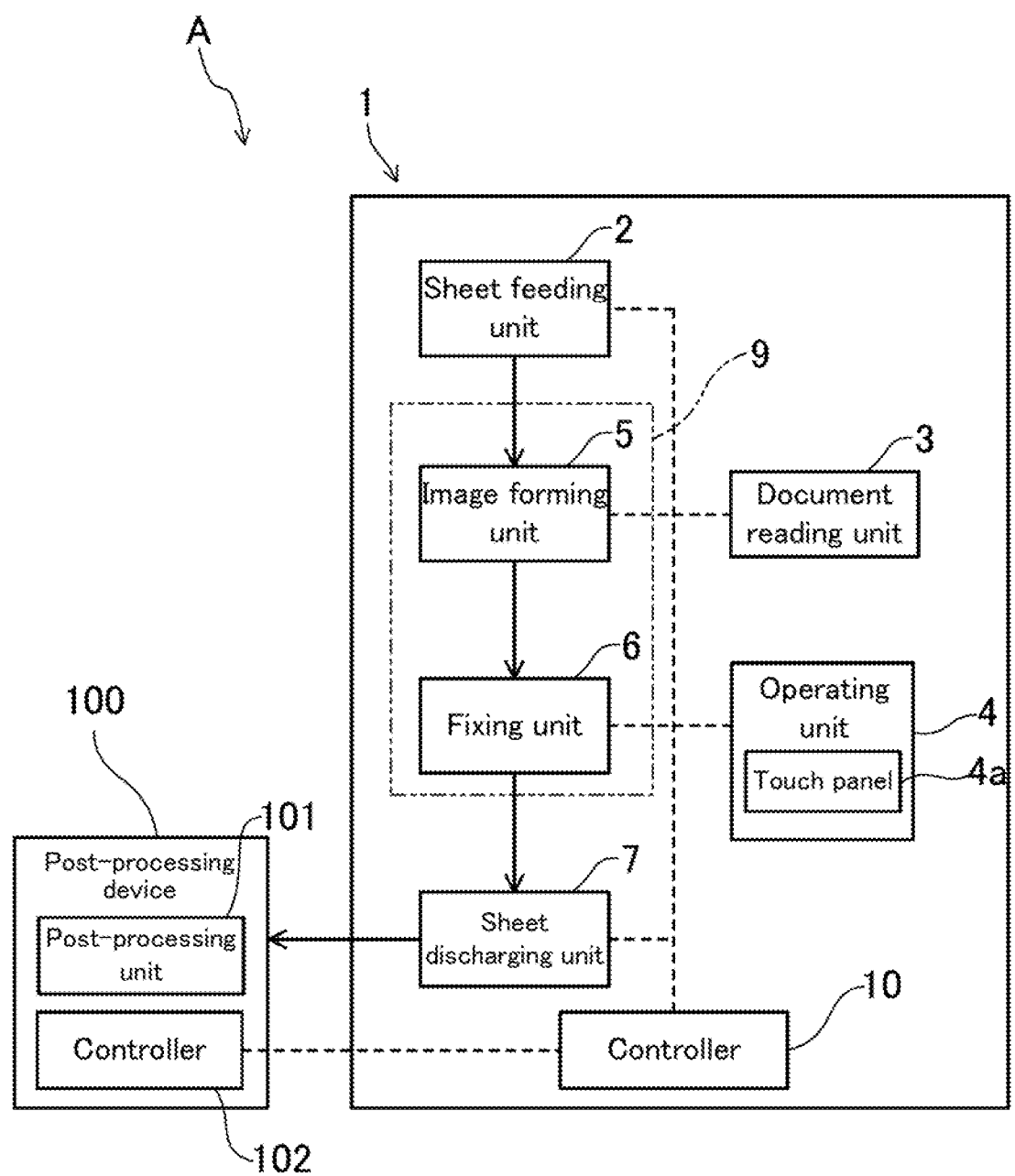
FIG. 1 is a diagram schematically illustrating a configuration of an image forming system including an image forming apparatus according to an embodiment of the present disclosure and a post-processing device attached to the image forming apparatus.

FIG. 1 is a block diagram illustrating an image forming system A that includes an image forming apparatus 1 according to this embodiment and a post-processing device 100 detachably attached to the image forming apparatus 1. Differently from mechanical drawings that geometrically show a positional relation among components, the block diagram of FIG. 1 shows components in blocks and schematically shows a sheet path and a signal path by solid arrows and broken lines, respectively.

The image forming apparatus 1 is, for example, a copying machine that includes a sheet feeding unit 2, a document reading unit 3, an operating unit 4, an image forming unit 5, a fixing unit 6, and a sheet discharging unit 7. The document reading unit 3 is arranged on an upper part of a body of the image forming apparatus 1 and the operating unit 4 is arranged on the front side of the document reading unit 3. The image forming unit 5, the fixing unit 6, and the sheet feeding unit 2 are arranged in middle and lower parts of the body of the image forming apparatus 1. The sheet discharging unit 7 is arranged under the document reading unit 3 in the body of the image forming apparatus 1. The post-processing device 100 is arranged adjacently to the sheet discharging unit 7 side of the image forming apparatus 1.

The sheet feeding unit 2 is a cassette sheet feeding unit or a manual sheet feed tray that feeds a sheet into the image forming unit 5.

The document reading unit 3 optically reads an image of a document set by a user, and photoelectrically converts the image into digital image data (hereinafter, referred to as "scan data"). The document reading unit 3 has, for example, a scanner casing that houses a reading unit, and a document feeder arranged on the upper side of the scanner casing. The scanner casing has a contact glass mounted on a top surface thereof. The document feeder feeds documents, which are stacked in a bundle on a document feed tray, one by one so that the documents individually pass through a predetermined reading position on the contact glass. The reading unit applies a light to each document passing through the predetermined reading position and guides a reflected light therefrom to an image sensor. The image sensor receives and photoelectrically converts the reflected light, thereby generating scan data of the documents.

The operating unit 4 accepts various settings and execution instructions which are made to the image forming apparatus 1 by a user. Specifically, the operating unit 4 has operation keys (not illustrated) and a touch panel (display unit) 4a. The operating unit 4 detects the operation keys or the touch panel 4a being operated and outputs to a controller 10 a detection signal indicating the operation.

Although not illustrated in the drawings, the image forming unit 5 includes a photosensitive drum as well as a charger, a developing device, and a transfer roller that are arranged around the photosensitive drum. The image forming unit 5 transfers a toner image onto a sheet fed thereinto from the sheet feeding unit 2 on the basis of scan data of a document generated by the document reading unit 3.

The fixing unit 6 includes a fixing roller and a pressure roller (both not illustrated) that are rotated in a state of being pressed against each other, and fixes an image (toner image), which is transferred onto a sheet by the image forming unit 5, on the sheet. The image forming unit 5 and the fixing unit 6 together function as a printing unit 9 that prints an image on a sheet.

The sheet discharging unit 7 includes a pair of sheet discharge rollers. The sheet discharging unit 7 receives a sheet having an image formed thereon from the fixing unit 6 and feeds the sheet to the post-processing device 100.

Figure 2A:
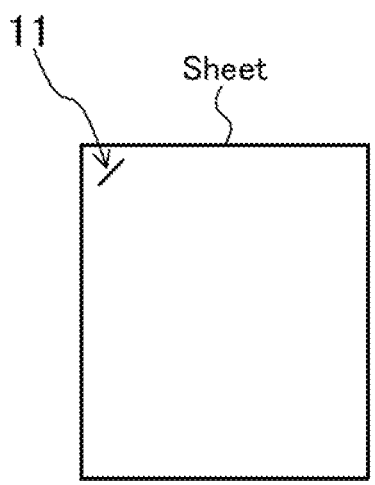
FIG. 2A is a diagram for explaining stapling, which shows a first manner.
Figure 2B:
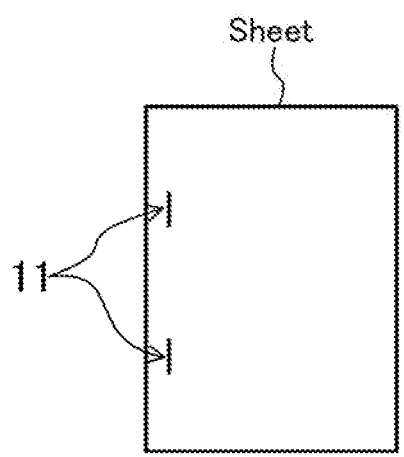
FIG. 2B is a diagram for explaining the stapling, which shows a second manner.

The post-processing device 100 includes a post-processing unit 101 and a controller 102 that controls the post-processing unit 101. The post-processing unit 101 performs stapling (example of post-processing) on sheets fed thereinto from the image forming apparatus 1. The stapling fastens an end portion of a bundle of sheets with a staple 11 (see FIGS. 2A and 2B). In this embodiment, the manner of fastening a bundle of sheets with the staple 11 is selectable from a first manner and a second manner. In the first manner, the staple 11 is inserted into one place at an upper left corner of the bundle of sheets at the angle of 45 degrees to the edges of the corner as shown in FIG. 2A. In the second manner, the staple 11 is inserted into two longitudinally spaced places at a left edge of the bundle of sheets as shown in FIG. 2B. In the second manner, each staple 11 is inserted parallel to the edge of the bundle of sheets.

[Configuration of Control System]

The image forming apparatus 1 includes a controller (printing control unit) 10 that controls overall operation of the image forming apparatus 1. The controller 10 is composed of a microcomputer including a CPU, a ROM, and a RAM. The controller 10 is connected to the units 2 to 7 of the image forming apparatus 1 via signal lines.

Figure 3:
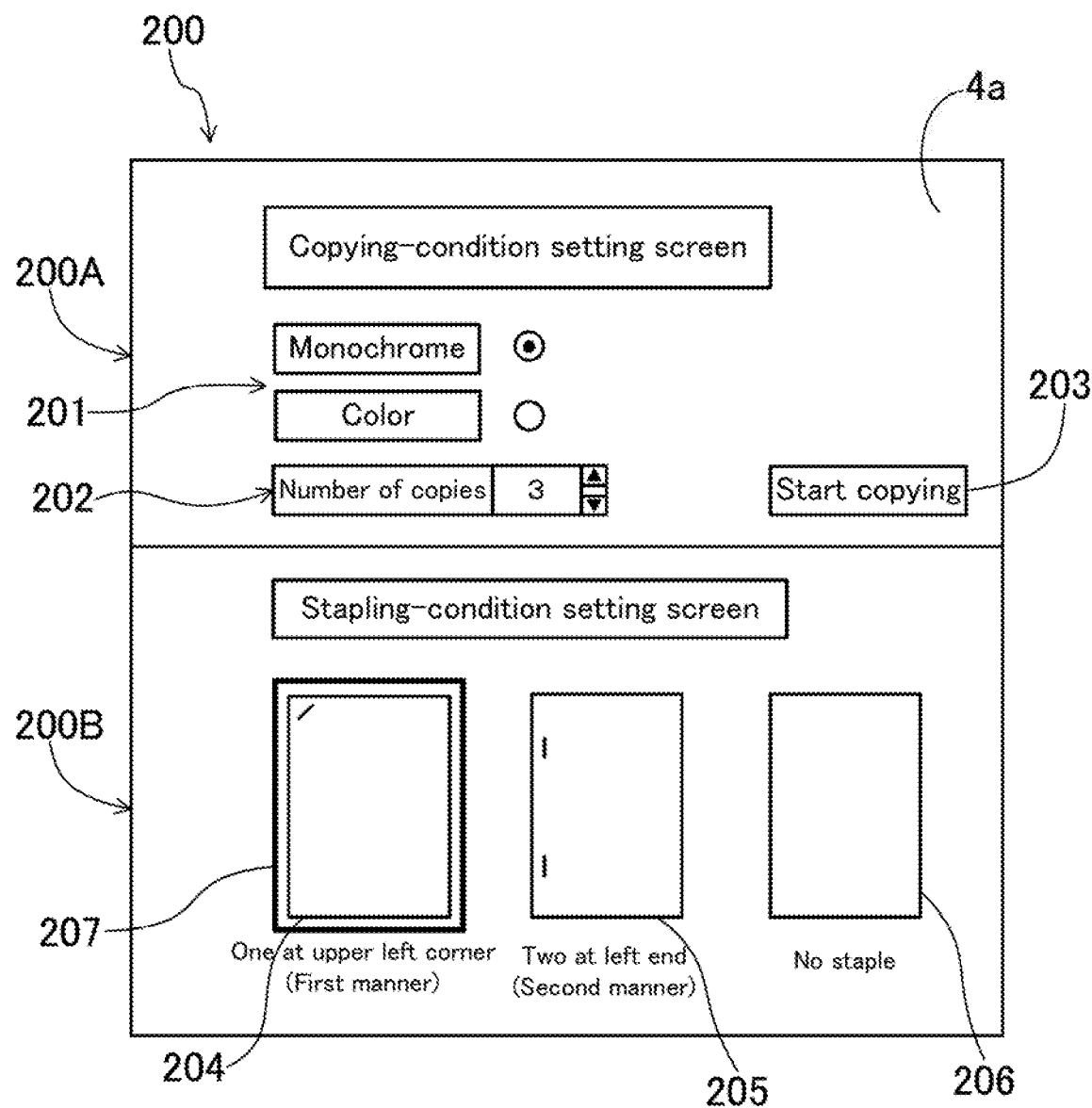
FIG. 3 is a diagram illustrating an example of an initial screen displayed on a touch panel of an operating unit.

Once a user logs in to the image forming apparatus 1, the controller 10 displays an initial screen 200 (see FIG. 3) on the touch panel 4*a*. The initial screen 200 has a copying-condition setting screen 200A and a stapling-condition setting screen 200B.

The copying-condition setting screen 200A has therein a selection part 201 for selecting either monochrome printing or color printing, an entry box 202 for entering the number of copies, and a start button 203 for instructing the image forming apparatus 1 to start copying.

The stapling-condition setting screen 200B has three icons 204 to 206 displayed therein that are aligned in the left-right direction. The left icon 204 is for setting the manner of stapling to the aforementioned first manner, the center icon 205 is for setting the manner of stapling to the aforementioned second manner, and the right icon 206 is for selecting "no stapling". The user is able to select one of the three icons 204 to 206 by moving a selection cursor 207 in the left-right direction on the touch panel 4*a*.

The controller 10 causes the image forming apparatus 1 to perform printing in accordance with the conditions for copying (hereinafter, referred to as "copying conditions") set in the initial screen 200. Further, the controller 10 transmits the condition for stapling (hereinafter, referred to as "stapling condition") set in the initial screen 200 to the controller 102 of the post-processing device 100. Thus, the controller 10 controls operation of the post-processing unit 101 of the post-processing device 100 in cooperation with the controller 102 of the post-processing device 100.

In this connection, in copying a document with the image forming apparatus 1, if a staple mark (post-processing mark) is present on the document, the staple mark can be printed on a sheet. The term "staple mark" means a linear recess formed in the surface of a document because of a staple 11 being deeply inserted into the document, which appears as a black line in scan data of the document. Such a black line being printed on a sheet reduces visual quality of the sheet.

Therefore, in this embodiment, the controller 10 changes the contents of printing control depending on whether an image of a staple mark is present in a document image of scan data.

[Particulars of Printing Control]

Figure 4:
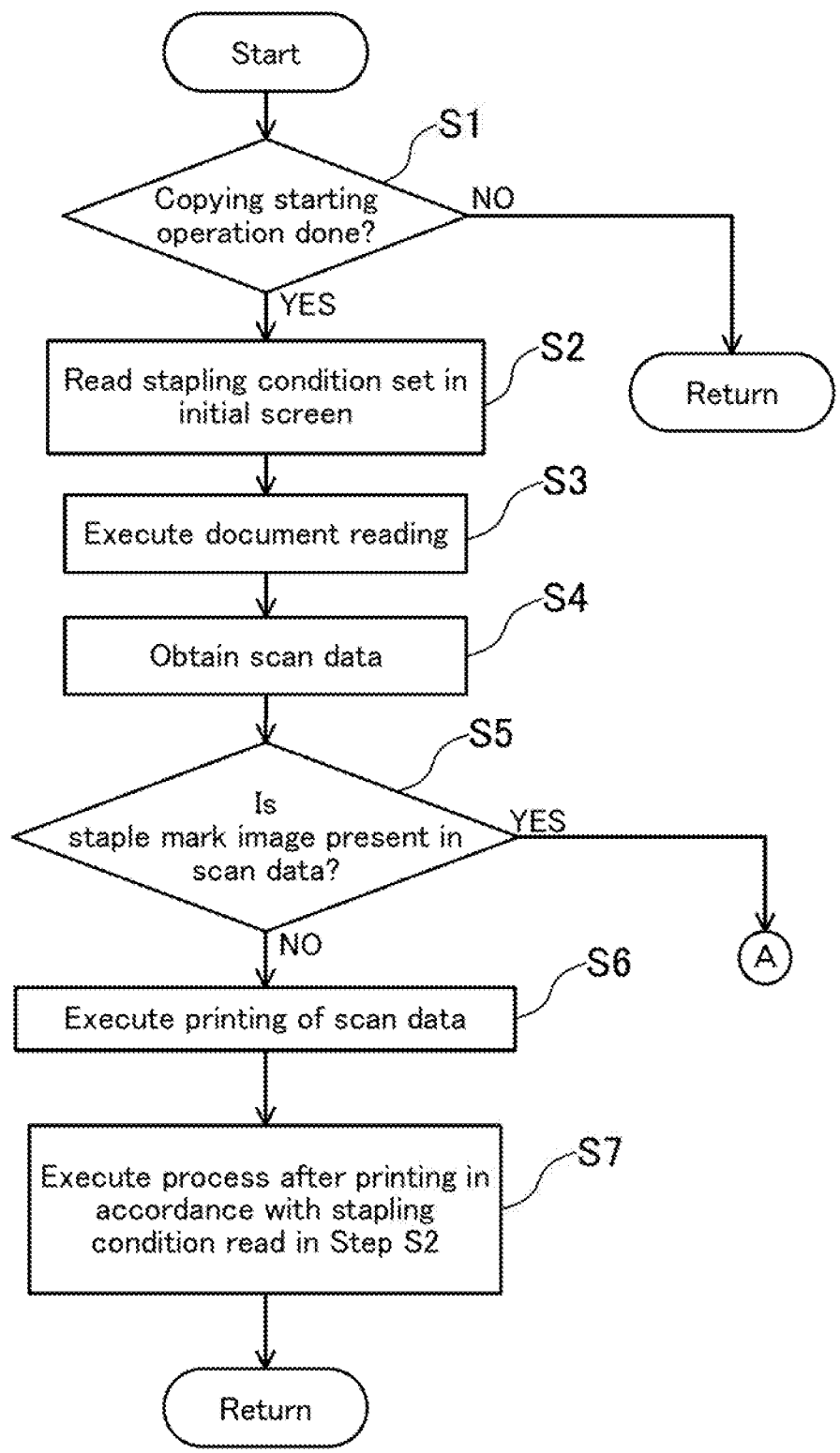
FIG. 4 is a flowchart showing the first half of printing control executed by a controller.
Figure 5:
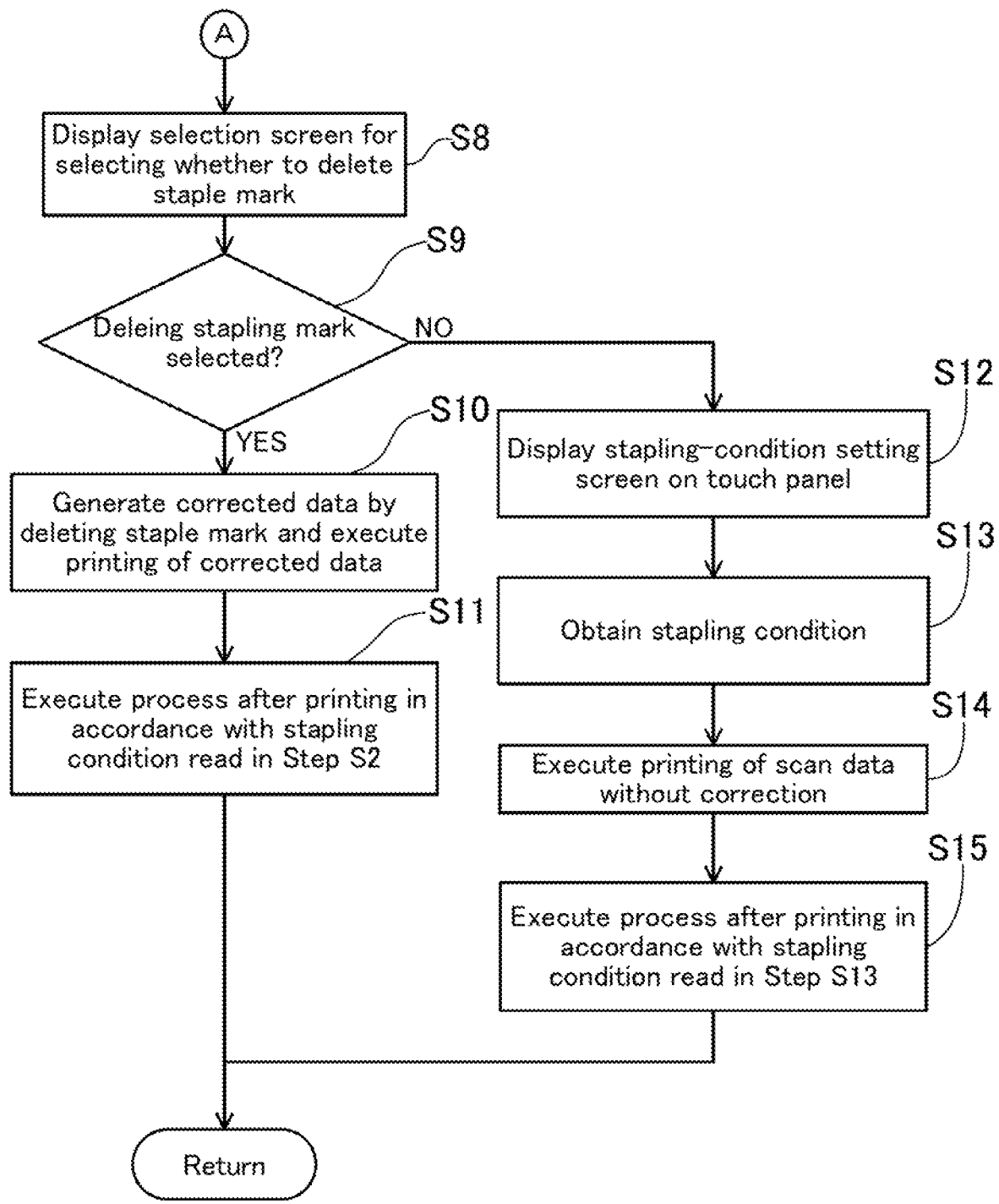
FIG. 5 is a flowchart showing the latter half of the printing control executed by the controller.

With reference to FIGS. 4 and 5, a specific example of the printing control executed by the controller 10 of the image forming apparatus 1 is described.

In Step S1, the controller 10 judges, on the basis of a signal transmitted from the touch panel 4*a* of the operating unit 4, whether a copying starting operation has been carried out. When the judgment is "NO", the controller 10 returns to Step S1. When the judgment is "YES", the controller 10 proceeds to Step S2.

In Step S2, the controller 10 reads, on the basis of signals transmitted from the touch panel 4*a* of the operating unit 4, the stapling condition set by the user in the initial screen 200.

In Step S3, the controller 10 causes the document reading unit 3 to perform a document reading operation.

In Step S4, the controller 10 obtains the scan data of the document generated by the document reading unit 3.

In Step S5, the controller 10 judges whether an image of a staple mark is present in the scan data obtained in Step S4. In this judgment, for example, when one line having a length of 6 mm or more is detected at an upper left corner of a document image of the scan data or two lines having a length of 6 mm or more are detected at a left edge of the document image of the scan data, the controller 10 judges that the image of the staple mark is present in the scan data. When the judgment in Step S5 is "YES", the controller 10 proceeds to Step S8 (see FIG. 5). When the judgment is "NO", the controller 10 proceeds to Step S6.

Because of executing the judgment of Step S5, the controller 10 has a function as a judging unit.

In Step 6, the controller 10 causes the printing unit 9 to print the scan data obtained in Step S4.

In Step S7, the controller 10 processes the printed sheets in accordance with the stapling condition read in Step S2, after which the controller 10 returns to Step S1.

Figure 6:
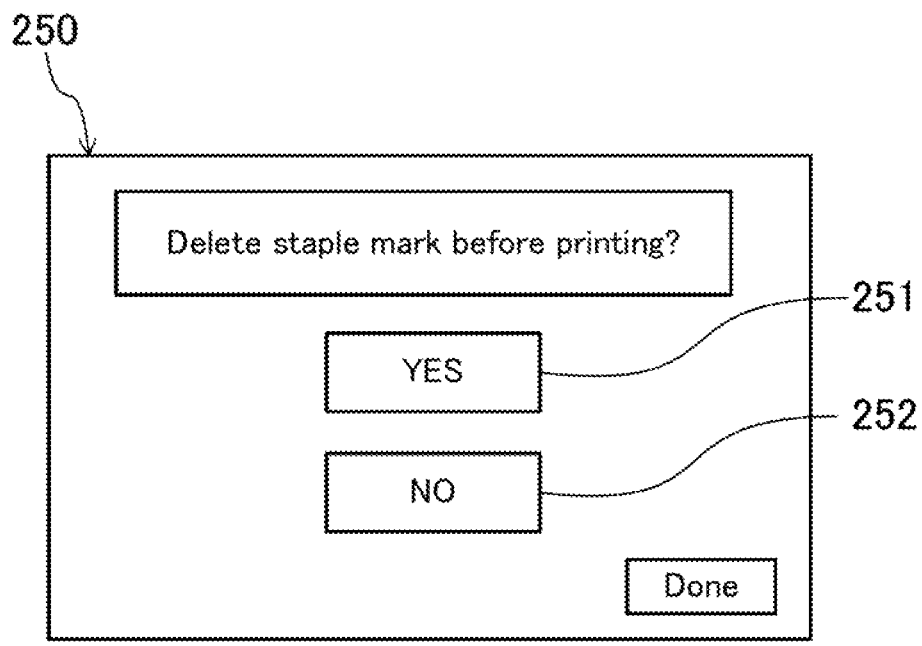
FIG. 6 is a diagram illustrating an example of a selection screen displayed on the touch panel of the operating unit.

In Step S8 to which the controller 10 proceeds when the judgment in Step S5 is "YES", the controller 10 displays a selection screen 250 (see FIG. 6) on the touch panel 4*a*. The selection screen 250 is for causing the user to select whether to delete the staple mark from the scan data before printing. As shown in FIG. 6, the selection screen 250 has a question message "Delete staple mark before printing?" displayed therein. Further, the selection screen 250 has therein two answer buttons, i.e., a "YES" button 251 and a "NO" button 252, for answering the question message. Note that the user may operate the selection screen 250 by touching the touch panel 4*a* with his/her finger or by using the operation keys provided separately from the touch panel 4*a*.

In Step S9, the controller 10 judges, on the basis of a signal transmitted from the touch panel 4*a* of the operating unit 4, whether deleting the staple mark is selected (the "YES" button 251 is selected) in the selection screen 250 in Step S8. When the judgment is "NO", the controller 10 proceeds to Step S12. When the judgment is "YES", the controller 10 proceeds to Step S10.

In Step S10, the controller 10 generates corrected data by deleting the image of the staple mark, and then causes the printing unit 9 to print the corrected data.

In Step S11, the controller 10 executes the process after printing in accordance with the stapling condition read in Step S2, after which the controller 10 returns to Step S1.

Figure 7:
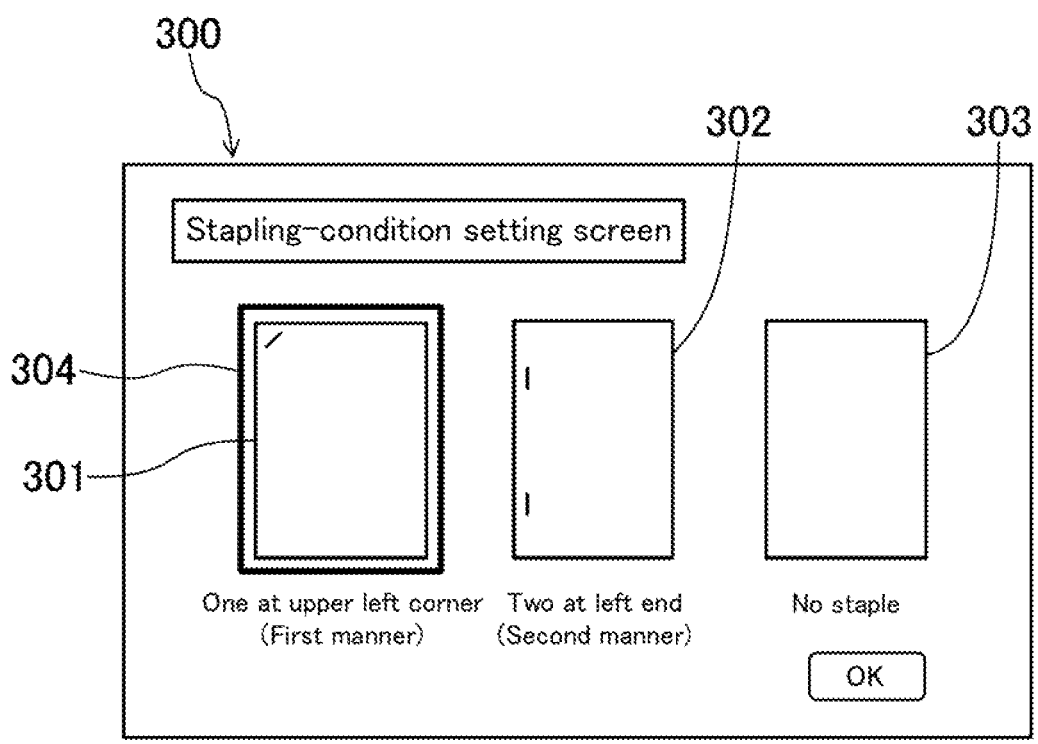
FIG. 7 is a diagram illustrating an example of a stapling-condition setting screen displayed on the touch panel of the operating unit.

In Step S12 to which the controller 10 proceeds when the judgment in Step S9 is "NO", the controller 10 displays a stapling-condition setting screen 300 (see FIG. 7) on the touch panel 4a of the operating unit 4. Similarly to the stapling-condition setting screen 200B in the initial screen 200, the stapling-condition setting screen 300 has therein an icon 301 for selecting the first manner as the manner of stapling, an icon 302 for selecting the second manner as the manner of stapling, and an icon 303 for selecting "no stapling". The user is able to select one of the three icons 301 to 303 by moving a cursor 304 in the left-right direction.

In Step S13, the controller 10 obtains, on the basis of a signal transmitted from the touch panel 4a of the operating unit 4, the stapling condition set by the user in Step S12.

In Step S14, the controller 10 causes the printing unit 9 to print the scan data obtained in Step S4, without correction.

In Step S15, the controller 10 executes the process after printing in accordance with the stapling condition set in Step S12, after which the controller 10 returns to Step S1.

[Operational Effects]

As described above, the image forming apparatus 1 according to this embodiment is configured such that the controller 10 judges whether an image of a staple mark is present in scan data generated by the document reading unit 3.

When the controller 10 judges that the image of the staple mark is present (when the judgment in Step S5 is "YES"), the controller 10 generates corrected data by deleting the image of the staple mark from the scan data and causes the printing unit 9 to print the corrected data.

This configuration can prevent a staple mark present on a document to be read by the document reading unit 3 from being printed on a sheet by the printing unit 9, so that the printed image is prevented from being of reduced visual quality.

Further, the controller 10 is configured to, after judging that the image of the staple mark is present in the scan data, display the selection screen 250 on the touch panel 4a to cause the user to select whether to delete the image of the staple mark (Step S8). When not deleting the image of the staple mark is selected in the selection screen 250 (when the judgment in Step S9 is "NO"), even though the image of the staple mark is present in the scan data, the controller 10 causes the printing unit 9 to print the scan data generated by the document reading unit 3, without generating the corrected data (Step S14).

With this configuration, when the user does not want to delete the staple mark, the scan data generated by the document reading unit 3 is printed by the printing unit 9 as it is. Therefore, for example, when the user does not want to take time to generate corrected data, such as, when the user wants to copy a document as quickly as possible, he/she can place quick processing before good printing quality by selecting not deleting the staple mark.

In this connection, a conceivable reason for the user to select not deleting the staple mark in the selection screen 250 is that he/she intends to carry out the stapling process after the printing process. If the user selects "no stapling" by mistake even though he/she intends to carry out the stapling process, he/she has to manually staple printed sheets, which is quite laborious for the user.

To avoid this problem, the controller 10 in this embodiment is configured to, when not deleting the staple mark is selected in the selection screen 250, before causing the printing unit 9 to start execution of printing, display the stapling-condition setting screen 300 on the touch panel 4a to cause the user to set the stapling condition.

With this configuration, even when the user selects "no stapling" in the initial screen 200 by mistake, the stapling-condition setting screen 300 is displayed on the touch panel 4a to prompt the user to set the condition for carrying out the stapling process. Thus, this configuration reliably prevents failure to set the stapling condition.

Further, in this embodiment, the post-processing to be performed by the post-processing device 100 has the first manner and the second manner available that are different in arrangement (at least one of position and number) of a place to be subjected to the post-processing. The stapling-condition setting screen 300 is configured such that the user is able to set the condition for the post-processing (i.e., the manner of stapling) by selecting one of the first and second manners.

This configuration allows the user to set the manner of stapling by himself/herself. Therefore, this configuration can prevent a stapling which does correspond to the staple mark on the sheets from being executed. Consequently, the sheets are prevented from being of reduced visual quality due to non-correspondence between the location of the staple mark and the location of the inserted staple 11.

Other Embodiments

In the above-described embodiment, the controller 10 displays the stapling-condition setting screen 300 on the touch panel 4a with the cursor 304 positioned at a randomly determined position. However, the present disclosure is not limited thereto. The controller 10 may be configured to identify a manner of stapling (the first manner or the second manner) corresponding to the staple mark present in the scan data, and display the stapling-condition setting screen 300 with the icon 301, 302 corresponding to the identified manner selected by the cursor 304. With this configuration, the user is able to easily set the manner of stapling.

In the above-described embodiment, an example configuration is described in which the post-processing device 100 performs stapling. However, the stapling is just an example of the post-processing to be performed by the post-processing device 100 and the present disclosure is not limited thereto. The post-processing may be punching for piercing a punching hole in a sheet. In the case of punching, for example, a configuration is possible in which the user is able to select a first manner in which two punching holes are pierced in a left end portion of a sheet or a second manner in which three punching holes are pierced. As for the printing control executed by the controller 10 in the case of punching, the term "staple mark" as a post-processing mark and the term "stapling" in FIGS. 4 and 5 should be replaced by "punching hole" and "punching", respectively. As for judgment whether an image of a punching hole (post-processing mark) is present in the scan data, for example, the controller 10 can be configured to judge whether two (or three) circles having a diameter of 2 mm or more are present at a left end of the document image of the scan data.

In the above-embodiment, the controller 10 is configured to, after judging that the image of the staple mark is present in the scan data, display the selection screen 250 (see FIG.

6) on the touch panel 4a to cause the user to select whether to delete the image of the staple mark. However, it is not necessarily required to confirm the user's intention through the selection screen 250. That is to say, the controller 10 may be configured to, after judging that the image of the staple mark is present in the scan data, automatically delete the image of the staple mark from the scan data without confirming the user' intention and then execute printing.

In the above-described embodiment, the printing unit 9 is configured to print an image by an electrophotographic method. However, the present disclosure is not limited thereto. For example, a printing unit which prints an image by an ink-jet method may be employed instead.

In the above-described embodiment, an example configuration is described in which the image forming apparatus 1 is a copying machine. However, the present disclosure is not limited thereto, and the image forming apparatus 1 may be, for example, a multifunction peripheral (MFP), a facsimile, or the like.

What is claimed is:

1. An image forming apparatus, comprising:
   a document reading unit reading an image of a document and generating scan data of the document;
   a printing unit printing on a sheet the scan data generated by the document reading unit, the
   image forming apparatus being configured to be able to feed the sheet subjected to printing by the printing unit to a post-processing device;
      a judging unit that judges whether an image of a post-processing mark is present in the scan data generated by the document reading unit, the post-processing mark including a staple mark or a punching hole; and
      a printing control unit that, when the judging unit judges that the image of the post-processing mark is present in the scan data, generates corrected data by deleting the image of the post-processing mark from the scan data and causes the printing unit to execute printing of the corrected data, and
   wherein the judging unit is configured to:
      when one line having a predetermined length is detected at an upper left corner of a document image of the scan data generated by the document reading unit or two lines having a predetermined length are detected at a left edge of the document image of the scan data, judge that an image of the staple mark as the post-processing mark is present in the scan data; and
      when two or three circles having a predetermined diameter or more are detected at a left end of the document image of the scan data, judge that an image of the punching hole as the post-processing mark is present in the scan data.

2. The image forming apparatus of claim 1, further comprising:
   a display unit controlled by the printing control unit; and
   unit, wherein
   the printing control unit is configured to:
      when the judging unit judges that the image of the post-processing mark is present in the scan data, display a selection screen on the display unit to cause a user to select whether to delete the image of the post-processing mark;
      when deleting the image of the post-processing mark is selected in the selection screen, cause the printing unit to execute printing of the corrected data; and
      when not deleting the image of the post-processing mark is selected in the selection screen, cause the printing unit to execute printing of the scan data generated by the document reading unit, without generating the corrected data.

3. The image forming apparatus of claim 2, wherein the printing control unit is further configured to:
   when not deleting the image of the post-processing mark is selected in the selection screen, before causing the printing unit to start execution of printing, display a condition setting screen on the display unit to cause the user to set a condition for a post-processing to be performed by the post-processing device; and
   when deleting the image of the post-processing mark is selected in the selection screen, cause the printing unit to execute printing of the corrected data without displaying the condition setting screen on the display unit.

4. The image forming apparatus of claim 3, wherein:
   the post-processing to be performed by the post-processing device has a plurality of manners available, the plurality of manners being different from each other in arrangement of a place to be subjected to the post-processing; and
   the condition setting screen is configured such that the user is able to select one of the plurality of manners to set the condition for the post-processing.

5. The image forming apparatus of claim 3, wherein:
   the post-processing to be performed by the post-processing device has a plurality of manners available, the plurality of manners being different from each other in arrangement of a place to be subjected to the post-processing;
   the condition setting screen is configured such that the user is able to select one of the plurality of manners to set the condition for the post-processing; and
   the printing control unit is further configured to, when not deleting the image of the post-processing mark is selected in the selection screen, before causing the printing unit to start execution of printing, identify from among the plurality of manners a manner corresponding to the image of the post-processing mark present in the scan data and display the condition setting screen on the display unit with the identified manner selected.

* * * * *